(No Model.)
N. W. LILLIE.
WIRE JOINT.
No. 535,592.　　　　Patented Mar. 12, 1895.
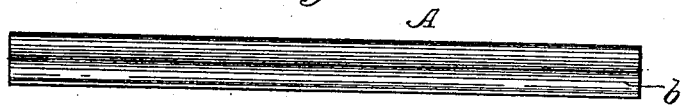
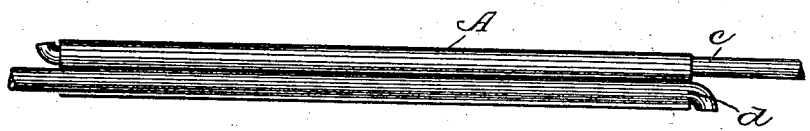
Witnesses
Jas. J. Maloney.
J. P. Livermore
Inventor:
Nathaniel W. Lillie,
by Jos. P. Livermore
Att'y

UNITED STATES PATENT OFFICE.

NATHANIEL W. LILLIE, OF SOMERVILLE, MASSACHUSETTS.

WIRE JOINT.

SPECIFICATION forming part of Letters Patent No. 535,592, dated March 12, 1895.

Application filed January 31, 1895. Serial No. 536,764. (No model.)

*To all whom it may concern:*

Be it known that I, NATHANIEL W. LILLIE, of Somerville, county of Middlesex, State of Massachusetts, have invented an Improvement in Wire Joints, of which the following description, in connection with the accompanying drawings, is a specification, like letters on the drawings representing like parts.

The present invention relates to wire joints or couplings and is especially intended for use with electric conductors in which case a joint of considerable tensile strength is required, as well as a very intimate union between the connected wires in order to secure good conductivity.

In accordance with the present invention a covering is also provided which completely surrounds the joint and protects the surfaces of contact between the two wires and the connector from the weather, thus preventing oxidation upon the said surfaces, which if it existed would impair or destroy conductivity.

Wire joints have been heretofore constructed by forming a pair of tubes connected together side by side, through which tubes the loose ends of the wires to be connected are intended to be thrust endwise after which the tubes and the wires contained therein are twisted longitudinally in order to prevent the wires from pulling out. This form of coupling is objectionable for the reason that the end of the wire may be slightly bent or burred so that it is difficult of insertion into the tube while the tubes themselves being connected together form considerable resistance to the twisting and tend to separate from the wire therein rather than to closely adhere thereto, and even if the end portion of the wire is smooth and straight it is frequently a difficult matter to pass the ends of the wire through the tubes and retain them there until secured by twisting.

The present invention is embodied in a coupling piece which obviates the difficulties above pointed out and is at the same time much simpler and less expensive.

The coupling piece embodying the invention is composed of a strip of suitable metal, preferably copper, bent longitudinally so as to form a coupling piece substantially S-shaped in cross section, or in other words, a coupling piece having two longitudinally open channels into which the end portions of the wires to be connected can be introduced laterally, one of said channels opening toward one side and the other toward the opposite side of the coupling piece, which together with the overlapping end portions of the wires may then be twisted, in which operation the channel walls are tightly closed upon the wire contained therein.

Figure 1 is a plan view of the coupling piece alone, embodying this invention; Fig. 2, an end view thereof; Fig. 3, a plan view of the coupling piece having the ends of the wire to be connected introduced therein preparatory to twisting the wires and coupling piece to complete the joint; Fig. 4, a cross section thereof. Fig. 5 is a plan view of the joint completed, and Fig. 6, a cross section thereof.

The coupling piece A is composed of a strip of pliant material preferably sheet copper longitudinally folded or bent to substantially S-shape in cross section as shown in Fig. 2, thus forming two longitudinally open channels $a$, $b$, on opposite sides. The channels are preferably rounded at the bottom and are of a width slightly greater than the diameter of the wire to be connected by them and a depth considerably greater than said diameter, preferably about double the diameter of the wire, so that when the outer walls or lips of the two channels are closed in about the wires, as shown in Fig. 6, they will more than encircle the wire and will lap over upon the opposite wall of the channel as shown in Fig. 6. The end portions of the wires $c$, $d$, that are to be united by the coupling are introduced into the said channels $a$, $b$, as shown in Figs 3 and 4, preferably extending the entire length thereof and terminating a short distance beyond the end of the coupling piece as shown in Fig. 3. Inasmuch as the channels are open, the wire may be introduced laterally therein and consequently may have their extremities bent or offset as shown in Fig. 3, which will facilitate retaining of the wires in place until the entire joint is twisted to securely unite the wires. Preparatory to twisting the coupling piece and end portions of the wires contained therein, the walls of the channels at each extremity of the coupling piece may be closed down upon the wires by the action of pliers or other suitable implement after which the coupling piece and contained wires are twisted longitudinally, in which operation the wires will tend to press to the bottom of the respective channels, and the outer walls of the latter will close in over the wire as a result of the twisting operations.

As the two wires and the connecting piece A are twisted it will be seen that the outer surface of the rounded or bottom portion of each channel will be forced into contact with the inner surface of the edge or lip of the other channel, the said edge being slightly bent back and stretched so that the said portions form a very tight joint as indicated in Figs. 5 and 6. The walls of the connector are at the same time drawn or wrapped tightly around the wire so that perfect electrical contact is established between them, while the overlapping edges of the outer wall of each channel press firmly upon the convex or outer surface of the other channel forming a tight joint and a complete covering for the wires which effectually keeps out moisture or other elements which would tend to set up oxidation or corrosion and thus impair the efficiency of the joint as an electrical connection.

A coupling formed in this way with channels laterally open not only affords the obvious advantage of admitting the introduction of the wires laterally instead of longitudinally but also causes the wires to be brought into closer electrical union with each other since the overlapping edge of one channel coming into contact with the rounded outer portion of the other channel is stretched and its tensile strength resisting such stretching tends to press the coupling piece firmly upon the wires, as well as to bring a strong pressure at the overlap or contacting portions of the coupling, by reason of which each wire is finally completely surrounded and tightly inclosed. The coupling is also simply and inexpensively constructed since its consists merely of a flat strip of sheet metal stamped or bent to the shape desired, with no solder or tubular formation. While the invention herein described is especially adapted for use with electrical conductors in which case the coupling piece is preferably formed of copper, it is to be understood that the same coupling is adapted for use in other connections, and the invention is therefore not limited to a coupling piece formed of any particular metal but is embodied in any metallic coupling piece of substantially the nature herein shown and described.

I claim—

A coupling piece for uniting wires consisting of a metallic strip S-shaped in cross section and thus having longitudinally open channels on opposite sides, in which channels the wires are adapted to be introduced, the said coupling piece and wires therein being adapted to be twisted to inclose and unite said wires, substantially as described.

In testimony whereof I have signed my name to this specification in the presence of two subscribing witnesses.

NATHANIEL W. LILLIE.

Witnesses:
H. J. LIVERMORE,
M. E. HILL.